United States Patent [19]

Robillard et al.

[11] Patent Number: 5,706,278
[45] Date of Patent: Jan. 6, 1998

[54] DETERMINISTIC NETWORK PROTOCOL

[75] Inventors: Michael N. Robillard, Shrewsbury; Brian D. Morrison, Hopkinton, both of Mass.

[73] Assignee: Raytheon Company, Lexington, Mass.

[21] Appl. No.: 504,844

[22] Filed: Jul. 20, 1995

[51] Int. Cl.$^6$ .............................. H04J 14/08; H04L 12/43
[52] U.S. Cl. .......................... 370/222; 370/443; 370/452; 370/460
[58] Field of Search .................... 370/16, 16.1, 85.2, 370/85.3, 85.12, 85.15, 222–224, 442–444, 452–456, 460; 340/825.05

[56] References Cited

U.S. PATENT DOCUMENTS

| | | | |
|---|---|---|---|
| 4,209,838 | 6/1980 | Alcorn, Jr. et al. | 364/200 |
| 4,482,999 | 11/1984 | Janson et al. | 370/396 |
| 4,545,077 | 10/1985 | Drapala et al. | 455/612 |
| 4,695,952 | 9/1987 | Howland | 364/200 |
| 4,763,320 | 8/1988 | Rudolph et al. | 370/221 |
| 4,779,261 | 10/1988 | Yamagishi et al. | 370/222 |
| 4,872,163 | 10/1989 | Follett et al. | 370/94.1 |
| 4,907,232 | 3/1990 | Harper et al. | 371/36 |
| 4,918,690 | 4/1990 | Markkula, Jr. et al. | 370/94 |
| 4,939,728 | 7/1990 | Markkula, Jr. et al. | 370/94.3 |
| 4,941,143 | 7/1990 | Twitty et al. | 370/85.2 |
| 5,012,469 | 4/1991 | Sardana | 370/95.3 |
| 5,168,568 | 12/1992 | Thayer et al. | 395/725 |
| 5,197,697 | 3/1993 | Lyloc et al. | 244/197 |
| 5,249,270 | 9/1993 | Stewart et al. | 395/200 |
| 5,297,143 | 3/1994 | Fridrich et al. | 370/85.3 |
| 5,301,185 | 4/1994 | Cherry | 370/85.15 |
| 5,307,349 | 4/1994 | Shloss et al. | 370/85.2 |
| 5,319,642 | 6/1994 | Ota | 370/85.3 |
| 5,327,432 | 7/1994 | Zein Al Abedeen et al. | 370/95.3 |
| 5,497,370 | 3/1996 | Hamada et al. | 370/396 |
| 5,576,702 | 11/1996 | Samoylenko | 370/455 |

FOREIGN PATENT DOCUMENTS

| | | | |
|---|---|---|---|
| 117 442 | 9/1984 | European Pat. Off. | |
| 137 225 | 4/1985 | European Pat. Off. | |
| WO 83/03936 | 11/1983 | WIPO | H04J 3/06 |

OTHER PUBLICATIONS

"Proceedings: Twentieth Annual Allerton Conference on Communication, Control, and Computing", H. Poor and W. Jenkins (Conf. Co-Chairman), Conf. held Oct. 6–8, 1982, Sponsored by Univ. of Illinois, Dec. 31, 1984, pp. 7–14.

Udd, E. and Varshneya D. "Fly–by–Light", Proceedings SPIE—The International Society for Optical Engineering, vol. 2295, Jul. 27–28, 1995, San Diego, California, pp. 46–51.

Hughes, D. "Raytheon/Beech Pursue Low–Cost Fly–By–Light". Aviation Week & Space Technology, Aviation Week Pilot Report Lockheed F–16 MATV, Raytheon/Beech Develop Fly–By–Light, May 2, 1994, pp.51–55.

Kandebo, S. "NASA, Navy to Evaluate Fly–By–Light Sensors in F/A–18", Aviation Week & Space Technology, Aug. 2, 1993, pp. 55–56.

Morrison, B. "Flight Test of a Low–Cost Distributed Control–By–Light System", Journal of ATC, Jan.–Mar. 1995, pp. 21–23.

Todd, J. "Development of Fly–By–Light Systems", Douglas Aircraft Company McDonnell Douglas Corp., Long Beach, CA. SPIE vol. 1173 Fiber Optic Sysems for Mobile Platforms III, 1989, pp. 139–146.

Palumbo, D. "A Low Maintenance and Highly Reliable Fly–By–Light Architecture" NASA Langley Research Center, pp. 477–481, (undated).

*Primary Examiner*—Melvin Marcelo
*Attorney, Agent, or Firm*—Donald F. Mofford

[57] ABSTRACT

A deterministic network protocol for connecting critical sensors, actuators and computing elements on a bi-directional, time-multiplexed, fiber optic or other media data bus, such that critical messages have concisely bounded latency and non-critical messages may be sent without impacting critical messages. It is a unique combination of a time-slot allocation protocol and a contention-based protocol in which global synchronization information is passed on the data media via a synchronization beacon.

33 Claims, 7 Drawing Sheets

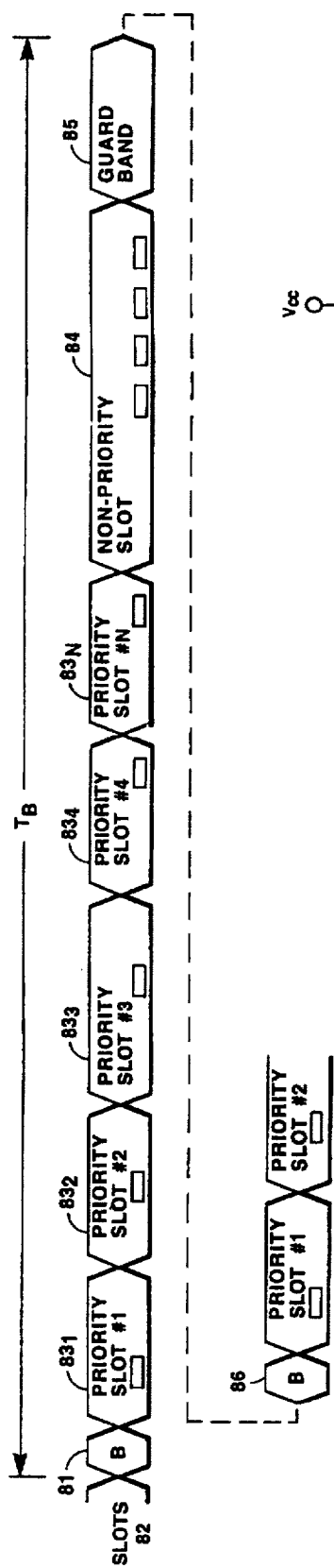
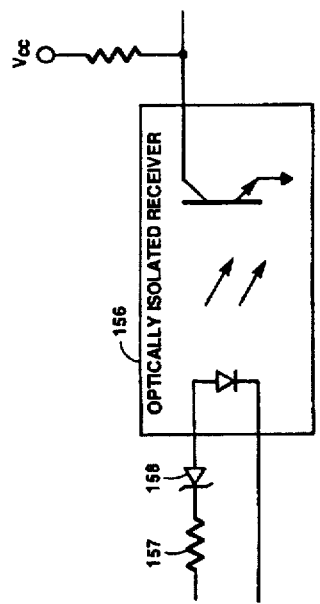
Fig. 3
Fig. 8

DETERMINISTIC NETWORK PROTOCOL

BACKGROUND OF THE INVENTION

This invention relates to an apparatus and method for sending and receiving data over a bi-directional bus of a distributed intelligence system and in particular to a deterministic network protocol which provides for a combination of a contention protocol and a time slot allocation protocol.

A bi-directional bus architecture is composed of multiple transmitter/receiver pairs connected over a network via a time multiplexed data channel. Within a bi-directional bus architecture, some method is used to regulate the transmitters access to the data channel. Controlling access to the data channel may be done via a single or redundant central bus arbiter or in a distributed manner where each transmitter node of a network has the means to arbitrate usage of the data channel.

In the prior art there are four basic bus access protocols suitable for controlling access to bi-directional buses such as contention, time slot allocation, command/response and token passing. Such protocols may be implemented in hardware, software or a combination of both.

Contention based protocols allow data collisions to occur as a normal course of events. The data is then retransmitted after hardware or software detects the collision usually after either a prioritized or a random period of time elapses. This protocol offers the lowest minimum data latencies under light network loads, but can collapse under heavy network loads due to an excessive number of collisions and networks.

The time slot allocation protocol pre-allocates network bandwidth to each user. All users are allocated a unique time slot during which they may transmit a data packet. However, this protocol suffers from a large minimum data latency under light network loads, but will not collapse under heavy loads. This protocol provides the advantages of guaranteeing a maximum data latency and has as a consequence a reduced data throughput.

The command response protocol requires the use of a central arbiter to allocate bus bandwidth to individual users. Although the central arbiter simplifies the design of a bus interface unit for each node of a network, it has the disadvantage of providing a potential central point of failure for a network.

Token passing protocols are similar to the time slot allocation protocol. Access to the data channel is controlled by passing a "token" as opposed to time based allocation. The characteristics of the two protocols are very similar.

One prior art approach to a data channel protocol for a time division communication network which dynamically switches among contention (ALOHA), reservation, and fixed assignment (TDMAs) protocols as a function of traffic on the channel is described in U.S. Pat. No. 5,012,469, issued Apr. 30, 1991 to Karamvir Sardana. This class of protocols is referred to as Aloha-Reservation-TDMA or ART class protocols. ALOHA protocols, typically used on satellite communications networks (SCNs), anticipate and deal with collisions in order to minimize the probability of their occurrence. The goal of ALOHA is to maximize throughput (network utilization) while minimizing average message delay. TDMA-Reservation protocols (TDMA-Res) allow stations (nodes) on a network to dynamically request time slots in which to transmit data. This method avoids collisions, but sacrifices throughput by allocating a portion of each time slot to the passing of reservation requests.

Another prior art approach is described in U.S. Pat. No. 5,297,141 issued Mar. 22, 1994 to Marek J. Fridrich et al. and assigned to Echelon Systems Corp. Fridrich teaches a network communication protocol that provides for improved reliable multicast messaging wherein messages may be reliably multicast to members of a multicast group and each member of the group responds to receipt of the message with an acknowledgment message. In the event one of the members of a group does not respond to a message with an acknowledgment, a reminder message is sent; hence, this protocol provides a random waiting time selected by the node before it attempts to send a message again. This protocol method tends to avoid collisions, but collisions still occur and critical messages do not have a concisely bounded latency.

There is a requirement particularly in aircraft applications for a distributed processing system to handle in a timely manner both critical and non-critical data messages. Critical messages require that all data latencies must be bounded to some known and predictable value. Non-critical messages are those for which a bounded data latency is not required. The present invention satisfies both of these requirements.

SUMMARY OF THE INVENTION

Accordingly, it is therefore an object of the invention to provide a distributed fault tolerant low-cost control system having a deterministic network protocol for communication with a plurality of processing nodes interconnected by at least one bi-directional fiber optic bus (preferred embodiment) or other transceiver media.

It is a further object of this invention to provide a deterministic network protocol in a distributed intelligence control system for handling priority and non-priority messages by a combination of time slot and contention based protocols, thereby maximizing utilization of the network without impacting data latencies.

It is a further object of this invention to provide synchronization means at each of the plurality of processing nodes with one of the nodes being assigned to generate a beacon master synchronization signal in order to prevent a single point failure within the distributed intelligence system.

The objects are further accomplished by providing a combination of a distributed intelligence control system comprising a plurality of nodes interconnected by at least one bi-directional data bus, each of the nodes comprises transceiver means for transmitting and receiving messages via the data bus, each of the nodes comprises processor means coupled to the transceiver means for processing said messages to and from said transceiver means, control means included in each of the transceiver means for generating a timing beacon in a predetermined one of the nodes for transmission to each of the other nodes via the data bus, and the control means comprises means for generating a plurality of time slots within a time period of the timing beacon wherein each of the nodes is preassigned to at least one of the time slots for transmitting critical messages at a predetermined time and at least one of the time slots being provided for contention by the plurality of nodes for transmitting non-critical messages. The distributed control systems comprises two or more of the bi-directional data buses for fault tolerant operation, depending upon application and criticality. The bi-directional data bus comprises a fiber optic means or other media means for providing a transmission medium. The transceiver means in the preferred embodiment comprises bi-directional photo diodes or other devices for transmitting and receiving messages via said data bus.

The timing beacon comprises a pulse pattern recognized only by the control means and transparent to the processor means, the pulse pattern being recognized as an invalid data pattern.

The objects are further accomplished by providing in a network having a plurality of nodes, each of said nodes interconnected by at least one communication medium, a network protocol comprising, transceiver means in each of the nodes coupled to the communication medium for transmitting and receiving messages, processor means coupled to each of the transceiver means in each of the nodes for processing the messages to and from the communication medium, means in each of the nodes for generating and detecting a timing beacon for synchronizing the nodes, one of the nodes being preassigned to generate the timing beacon, the timing beacon comprises a pulse pattern recognized only by the nodes and transparent to the processor means, the pulse pattern not recognized as a valid data pattern, means is each of the nodes for generating a plurality of time slots during a time period of the timing beacon, each of the nodes being preassigned at least one of the time slots for transmitting critical messages and at least one of the time slots being provided for contention by the plurality of nodes to transmit non-critical messages. The communication medium comprises a fiber optic cable or other media for transmitting and receiving messages. The transceiver means in the preferred embodiment comprises bi-directional photo diodes for transmitting and receiving messages via said communication medium. Uni-directional photo diodes for transmitting and receiving messages via the communication medium, or other transceiver technologies such as twisted pair or power line modulation may also be used. The means for generating a plurality of time slots comprises a state machine for controlling the network protocol for transmitting and receiving the messages via the communication medium.

The objects are further accomplished by providing a network having a deterministic network protocol comprising a plurality of nodes, each of the nodes interconnected by at least three of a plurality of communication media for fault tolerant operation, transceiver means included in each of the nodes and connected to the plurality of communication media, for transmitting and receiving messages, processing means in each of the nodes coupled to the transceiver means for processing the messages to and from the communication media, means in each of the nodes for generating and detecting a timing beacon for synchronizing the nodes, one of the nodes being preassigned to generate the timing beacon, and means in each of the nodes for generating a plurality of time slots during a time period of the timing beacon, each of the nodes being preassigned at least one of the time slots for transmitting critical messages, and at least one of the time slots provides for contention by the plurality of nodes to transmit non-critical messages. The communication medium in the preferred embodiment comprises a fiber optic means for transmitting and receiving messages. The transceiver means comprises bi-directional photo diodes coupled to the communication media for transmitting and receiving messages via the communication media. The means for generating a plurality of time slots comprises a state machine for controlling a network protocol for transmitting and receiving the messages via the communication media.

The objects are further accomplished by a method of providing a distributed intelligence control system comprising the steps of, interconnecting a plurality of nodes by at least one bi-directional data bus, transmitting and receiving messages via the data bus with transceiver means in each of the plurality of nodes, processing the messages to and from the transceiver means with processor means coupled to the transceiver means, generating a timing beacon in a predetermined one of the nodes for transmission to each of the other nodes via the data bus with control means in each of the transceiver means, and generating a plurality of time slots within a time period of the timing beacon wherein each of the nodes is preassigned at least one of the time slots for transmitting critical messages at a predetermined time and at least one of the time slots is provided for contention by the plurality of nodes for transmitting non-critical messages.

BRIEF DESCRIPTION OF THE DRAWINGS

Other and further features and advantages of the invention will become apparent in connection with the accompanying drawings wherein:

FIG. 3 is an illustration of the time slot arrangement of the deterministic protocol within a beacon signal period;

FIG. 8 is a schematic representation of an optically isolated receiver shown in FIG. 7.

DESCRIPTION OF THE PREFERRED EMBODIMENT

Figure 1:
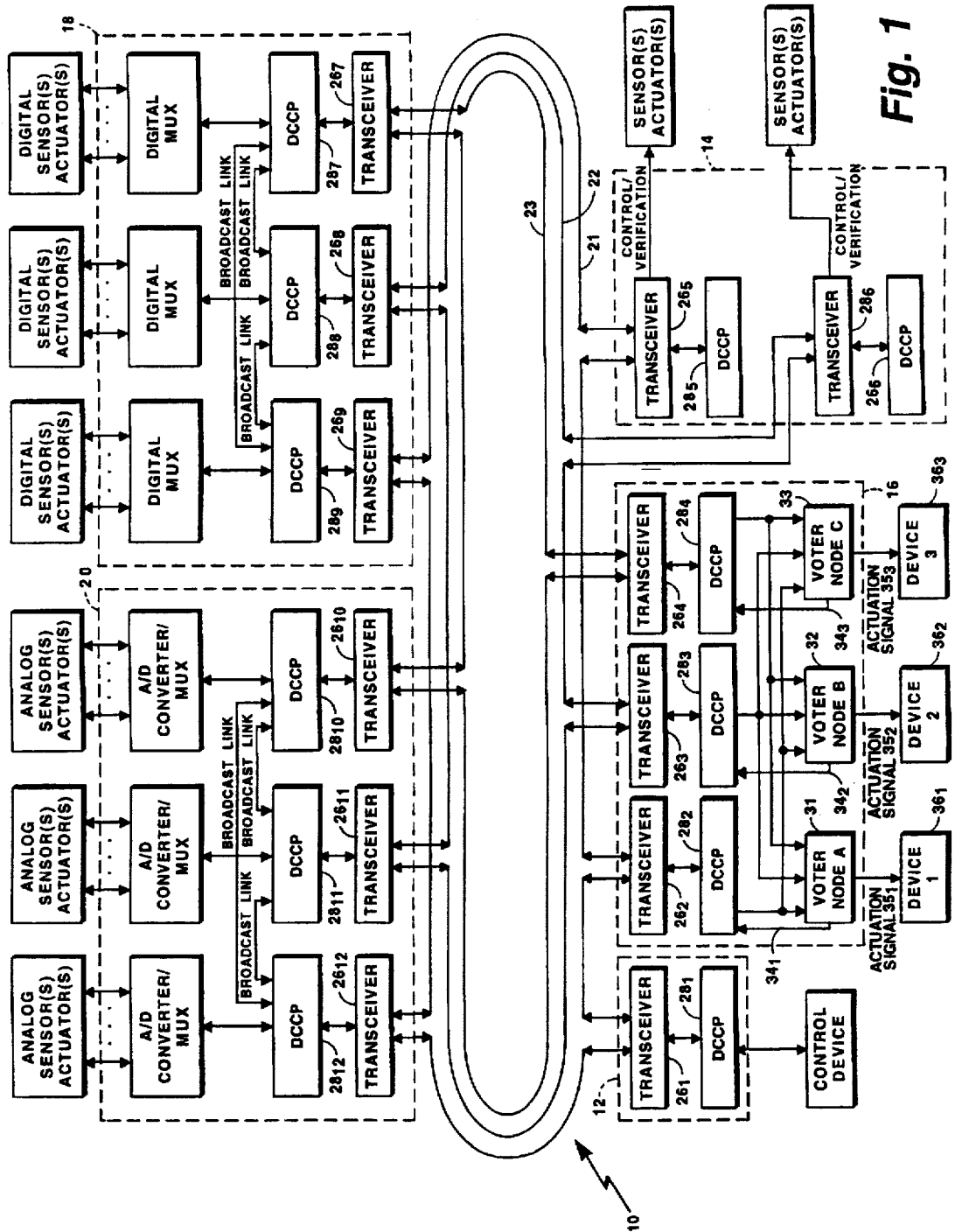
FIG. 1 is a block diagram of a fault-tolerant distributed control-by-light™ system employing the present invention.

Referring to FIG. 1, a block diagram of a distributed intelligence fault tolerant control-by-light™ system 10 is shown comprising a deterministic network protocol for communication with a plurality of intelligent nodes 12, 14, 16, 18, 20. Such nodes 12–20 are connected to one or more bi-directional serial buses 21, 22, 23, each of said buses being a single fiber optic ring in the preferred embodiment. The number of nodes shown in FIG. 1 is only representative of a system and one skilled in the art will recognize that many node configurations are feasible depending on the particular system application. The system 10 is particularly useful for aircraft control by providing a low cost fault-tolerant control-by-light™ distributed intelligence system for sensing and control across fault tolerant fiber optic networks. The system 10 uses the distributed local intelligent nodes 12–20 to sense and/or control physical parameters and actuators with messages being passed across redundant serial buses 21,22,23 whenever sense or control information changes. In order to achieve fault tolerant operation, two, three or four or more redundant data buses are employed depending upon the criticality, and redundancy is also employed in certain intelligent nodes performing critical functions such as sensor/actuator functions in an aircraft control system. The coupling of the nodes 12–20 to the serial data buses is accomplished by transceivers $26_{1-N}$ and each transceiver $26_{1-N}$ is connected to a digital control and communication processor (DCCP) $28_{1-N}$. Each combination of a transceiver and a DCCP may be referred to as a processing element. This system 10 in an aircraft application replaces mechanical, hydraulic and electrical controls now used by aircraft pilots to control, monitor, and display primary and secondary flight control functions and it provides substantial weight, cost, safety and performance advantages over current techniques. This system 10 is applicable to control of other systems besides aircraft such as ground transportation, surface and submarine ships, spacecraft, utilities and industrial process controls. Although the data bus media in the present preferred embodiment is implemented with fiber optics, the deterministic network protocol is applicable to other medias such as twisted pair wiring and power lines.

Node 12 is representative of a simplex control node, node 14 is representative of a dual control node, and node 16 comprises triple control nodes including fault tolerant intelligent voters which are described hereinafter. Node 18 is a fault tolerant, fail fast, simple digital node for interfacing with digital sensors/actuators and node 20 is a fault tolerant, fail fast, triple analog node for interfacing with analog sensors/actuators. The broadcast link shown in node 18 and node 20 is a bi-directional serial bus similar to buses 21,22,23. The preferred embodiment of the broadcast link replaces the bi-directional photo-diodes 68 and 70 and the Single Fiber Analog Interface 66 of FIG. 2 with an optically isolated electrical interface. This provides a reduction of node cost, and is appropriate for use within a single equipment enclosure such as would typically be used for a node such as 18 or 20. By distributing the system intelligence to every node, network communications is reduced, autonomy for failure-recovery is enhanced, and reliability is improved.

In an aircraft application of the control-by-light™ system 10, information flow between node computers can be minimized by distributing the control algorithms across the aircraft. It becomes possible to design a set of global data messages which pass across the communication network and correspond to aircraft state, physical parameters, and pilot commands. Individual nodes 12–20 may subscribe to a given set of messages depending on the function they perform. For example a thrust reverser control computer would subscribe to messages indicating whether the aircraft is airborne, the state of the engine, the state of the thrust lever, the state of the landing gear, and whether the pilot has commanded thrust reverser deployment. The thrust reverser control computer would publish data messages corresponding to the state of the reverser system. A crew alerting computer or subsystem would then subscribe to the status messages being published by the thrust reverser control computer as well as from other computers and subsystems distributed across the network. For critical control functions, messages must be received and voted upon across redundant networks before actions are taken at the point of actuation.

A node computer such as the DCCP $28_{1-N}$ may be programmed to provide local loop closure on an actuator. By associating the software required to control the actuator with its actuator, and by standardizing on a network protocol, it becomes much easier to interface components across the aircraft, while also enhancing flexibility and configurability. Partitioning the software also aids in minimizing maintenance and certification costs.

The control-by-light™ system 10 uses fiber optic serial data buses 21,22,23 which support multiple message transmitters. The bus network relies on a distributed media access technique to eliminate collisions, while at the same time not introducing any single points of failure. The advantages of a collision free network protocol are well known and are especially desirable for aircraft control systems or other critical control system applications.

The bus network covering transceiver $26_{1-N}$ and buses 21,22,23 supports bi-directional communications over a single fiber by restricting communications to half duplex. This has the obvious benefit of reducing the cost to interconnect processing nodes to a single fiber. Each fiber optic transceiver 26 has two bi-directional, half duplex ports. This allows large networks to be created by connecting together processing elements into rings. Each node within the network or ring is connected to its neighbors by a bi-directional, half-duplex point to point fiber link. As a message propagates around the network, the message is regenerated at each node 12–20. To prevent a single node or link failure from disabling the network, every message is transmitted across the ring in both directions and is removed from the ring by the node which receives it from both directions. This method of transmission guarantees the delivery of all messages to all operating nodes, in the event of single hardware failures or fiber breaks.

The control-by-light™ system 10 uses combinations of traditional fault tolerant techniques including hardware redundancy, software redundancy, temporal redundancy, and information redundancy. Flight critical functions are implemented using nodes composed of multiple processing elements. Hardware and software voters are utilized to ensure the validity of commands. Multiple, independent data buses 21,22,23 are utilized to ensure the validity of data. Asynchronous sampling techniques are used to reduce the effects of transient upsets or disturbances. Software design includes techniques such as recovery blocks and reasonableness checking known to those of ordinary skill in the art of software fault tolerance.

The DCCPs $28_{1-N}$ in the nodes 12–20 are powered from multiple sources to allow the system 10 to operate while an aircraft or other system is in an emergency reversionary state. Internally, the DCCPs $28_{1-N}$ utilize more than one power supply to allow for uninterrupted operation after a single hardware fault. Depending upon the application and the criticality of the function being implemented, multiple actuators and sensors can be used.

A control-by-light™ system enforces the partitioning of software across multiple processing elements thereby creating independent software executables which implement an easily definable function. All the independent routines communicate via a well defined interface. The software partitioning allows for exhaustive testing of the software, providing a level of confidence which is often difficult and expensive to achieve on more centralized systems.

Figure 2:
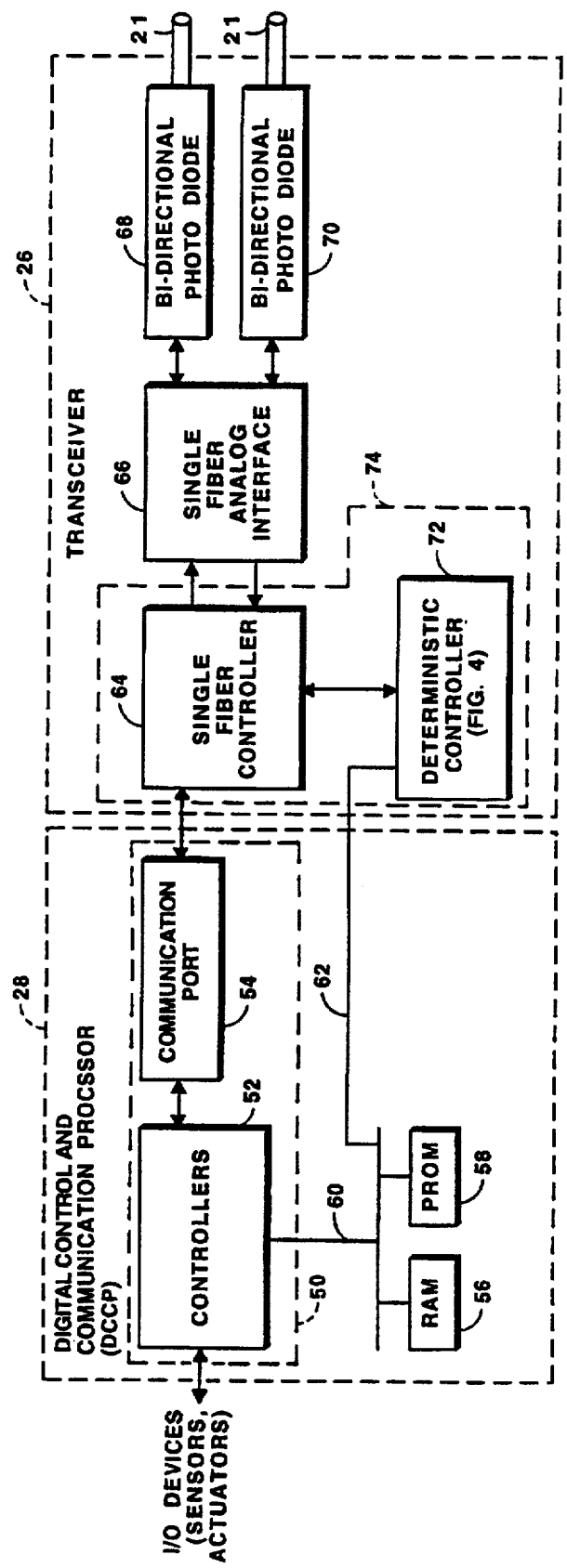
FIG. 2 is a block diagram of a transceiver coupled to a digital control and communication processor as shown in FIG. 1.

Referring to FIG. 2 block diagrams of the digital control and communication processor (DCCP) 28 and the transceiver 26 forming a processing element are shown. The DCCP 28 provides the network and applications—specific processing within a node to process inputs from sensors and control devices intelligently and propagate control information across a network such as is shown in FIG. 1. The DCCP 28 comprises a VLSI chip 50 having three controllers 52 which include a media access control (MAC) processor, a network processor and an application processor; all three controllers 52 communicate on common address and data bus 60 to a random access memory (RAM) 56 and non-volatile, programmable read only memory (PROM) 58. The three controllers 52 are coupled to a network communication port 54 which interfaces with the single fiber controller 64 of transceiver 26. The transceiver 26 and in particular the deterministic controller 72 is connected to the bus 60 via a bus extension 62. The RAM 56 provides general purpose storage of network messages and program variables. The PROM 58 stores programs and configuration data for the three controllers 52, including a media access control system routine described hereinafter for initiating a priority or a non-priority message onto the network bus 21,22,23. The operation of the VLSI chip 50 is described in a Neuron® Data Book dated February 1995 for the 3150 chip published by Echelon Corporation of Palo Alto, Calif. which is incorporated herein by reference. The VLSI chip 50 may be embodied by Part No. MC143150 manufactured by Motorola Inc. of Phoenix, Ariz. Other similar microcontrollers with network communication capabilities may also be used to implement the VLSI Chip 50. The RAM may be embodied by Part No. CY7C199 manufactured by Cypress Semiconductor of San Jose, Calif. The PROM 58 may be embodied by Part No. AT29C256 manufactured by Atmel Corp., San Jose, Calif. and programmed by Raytheon Company of Marlborough, Mass.

Referring to FIGS. 1 and 2, the transceiver 26 receives and transmits data over the bi-directional data bus 21 (and buses 22,23). Data packets from or to the fiber optic data bus 21 are passed through bi-directional photo diodes 68,70 which are coupled to a single fiber analog interface (SFAI) 66 in the preferred embodiment, or in an alternate embodiment through twisted pair or other media transceivers or through separate transmit photo diodes and receive photo diodes or laser diodes which require two fiber optic cables between each node and dual fiber analog interfaces although two fiber optic cables are required. The uni-directional diodes are less costly. The SFAI 66 converts low level analog signals from the bi-directional photo diodes 68,70 to CMOS or TTL levels and vice-versa. The bi-directional diodes 68,70 function in a "ping-pong" mode whereby they operate as either a receiver or a transmitter. The photodiodes 68,70 may also operate uni-directional whereby the operation is receive only or transmit only. Providing support for two ping-pong diodes allows for data transfers to occur in different communication topologies, e.g. a ring or star configuration. The SFAI 66 provides for rapid packet mode response from a quiet network condition to packet detection and the SFAI 66 provides for minimal turn around time from transmit to receive mode or from receive to transmit mode. The SFAI 66 converts the inputs of the photo diodes 68,70 to digital signals when in the receive mode and it converts digital signals to drive signals required by the bi-directional photo diodes 68,70 in the transmit mode. The SFAI 66 may be embodied by Part No. G641848-1 manufactured by Raytheon Company of Marlborough, Mass. The bi-directional photo diodes 66,70 may be embodied by Model 1A212-SMA2A manufactured by ABB Halo Inc. of San Diego, Calif., the fiber optic data buses 21,22,23 may be embodied by fiber optic cable such as Part No. BF04499 manufactured by Spectran Corp. of Avon, Conn.

The SFAI 66 is connected to a single fiber controller (SFC) 64 which is connected to a deterministic controller (DC) 72. The SFC 64 interfaces with a communication port 54 of the DCCP 28 and the DC 72 interfaces with buses 60,62 of the DCCP 28. The combination of the SFC 64 and DC 72 is referred to as a single fiber controller-deterministic (SFC-D) 74. The SFC-D 74 communicates bi-directionally (half-duplex) via the fiber optic data buses. It provides the control for the operation of the deterministic network protocol including a contention type protocol of the DCCP 28. Since the transceivers $26_{1-N}$ are operated in a circular or ring topology as shown in FIG. 1, the SFC 64 provides an anti-recirculation timer to automatically prevent data packets from being recirculated by deleting such data packets from the network once they are received at all nodes 14–20. The SFC 64 restores signal quality at each node 14–20 and provides for pulse width distortion compensation resulting from non-symmetrical high-to-low and low-to-high propagation delays. It also provides optical power monitoring by measuring the magnitude of pulse width distortion which provides a relative implication of optical power strength. The SFC 64 restores the signal pulse width before sending the signal to the DCCP 28 or re-transmitting the signal.

Referring now to FIG. 2 and FIG. 3, FIG. 2 shows that the deterministic controller 72 is connected to the single fiber controller 64 and also interfaces with the DCCP 28. The DC 72 provides the control for a network response in a guaranteed time period by the unique combination of time slot and contention based communications. The use of the deterministic network protocol permits multiple nodes 12–20 of FIG. 1 to transmit data without chance of message collisions. Message collisions are undesirable since they result in the failure of the network to deliver these messages in a concisely bounded and predictable manner. Collision detection and/or message acknowledgment protocols could be used to detect failure of message delivery, but these methods do not provide a guarantee of system response time. The deterministic network protocol allows the system designer to place a concise upper bound on message delivery time. FIG. 3 shows a plurality of time slots 82 available for message or data packet communications. In the present embodiment, a Manchester—encoded data stream is used; however, other line protocols may be used as will be recognized by one of ordinary skill in the art. Each slot is a multiple of 12.8 microseconds in duration, although this duration will change according to the network transmission specification. The definition of slots 82 for each node 12–20 must be consistent with an overall network time line defined by a system designer. A node may be assigned more than one time slot. Time slots #1 to #N are the priority slots $83_1$–$83_N$ where contention is prevented because of hardware synchronization across the network nodes 12–20, with periodic resynchronization using the beacon signal. The next slot is the non-priority slot 84 where the contention based protocol is allowed to function. In order to provide synchronization, it is necessary to transport a synchronization signal across the network. Each node 12–20 provides for transmitting the synchronization signal, detecting the synchronization signal, and provides management of which node is in charge of originating this signal. The synchronization signal is referred to as the beacon and it may occur at time slots 81 and 86 in FIG. 3. The beacon is transported across the same medium as the subsequent data stream and does not require a separate line. The node that originates the beacon is referred to as the beacon master. The time slots 82 are measured from the time that a beacon is detected on the ring network buses 21, 22, 23. As a result, all nodes 12–20 are synchronized exactly, with the exception of skew caused by propagation delay of the beacon around the network and oscillator accuracy. The guardband time slot 85 allows time for any network message started late in the non-priority time slot 84 to be completed. Following the guardband slot 85 is a beacon slot 86 which is allocated for transmission of the network beacon; the beacon slot 86 is implicit and is automatically added by the state machine of the transceiver 26. The network beacon is periodically transmitted by one node to loosely synchronize all nodes 12–20 on the network.

The beacon pattern is chosen to satisfy the following requirements: (a) the beacon pattern must be distinct, i.e. it must be a pattern which cannot occur during transmission of a network message; (b) the beacon pattern must not adversely impact the operation of the digital control and communication processor (DCCP); and (c) the beacon pattern should be relatively short so as not to significantly reduce the time available for network messages. For the Manchester line code employed in the present embodiment, the beacon pattern selected to meet these requirements is defined as follows:

1. TTL high (LED on) for 2000 nanoseconds.
2. TTL low (LED off) for 400 nanoseconds.
3. TTL high (LED on) for 400 nanoseconds.
4. TTL low (LED off) for 400 nanoseconds.
5. TTL high (LED on) for 400 nanoseconds.
6. TTL low (LED off) for 400 nanoseconds.
7. TTL high (LED on) for 2400 nanoseconds.

This pattern violates the standards for a valid Manchester encoded data stream, and is referred to as the non-valid Manchester sequences. It, therefore, is a sequence which will not be confused with normal message transmission. Since the pattern is non-valid Manchester data, the DCCP 28 will not interpret a beacon as the start of a message, but will ignore it. The 6.4 microsecond duration of the beacon (the time required to establish the above pattern at a 1.25 megabits per second bit rate) is short compared to network messages, representing 8 bit periods on a 1.25 megabit per second network. On different bit rate networks, these times would be scaled accordingly.

Figure 4:
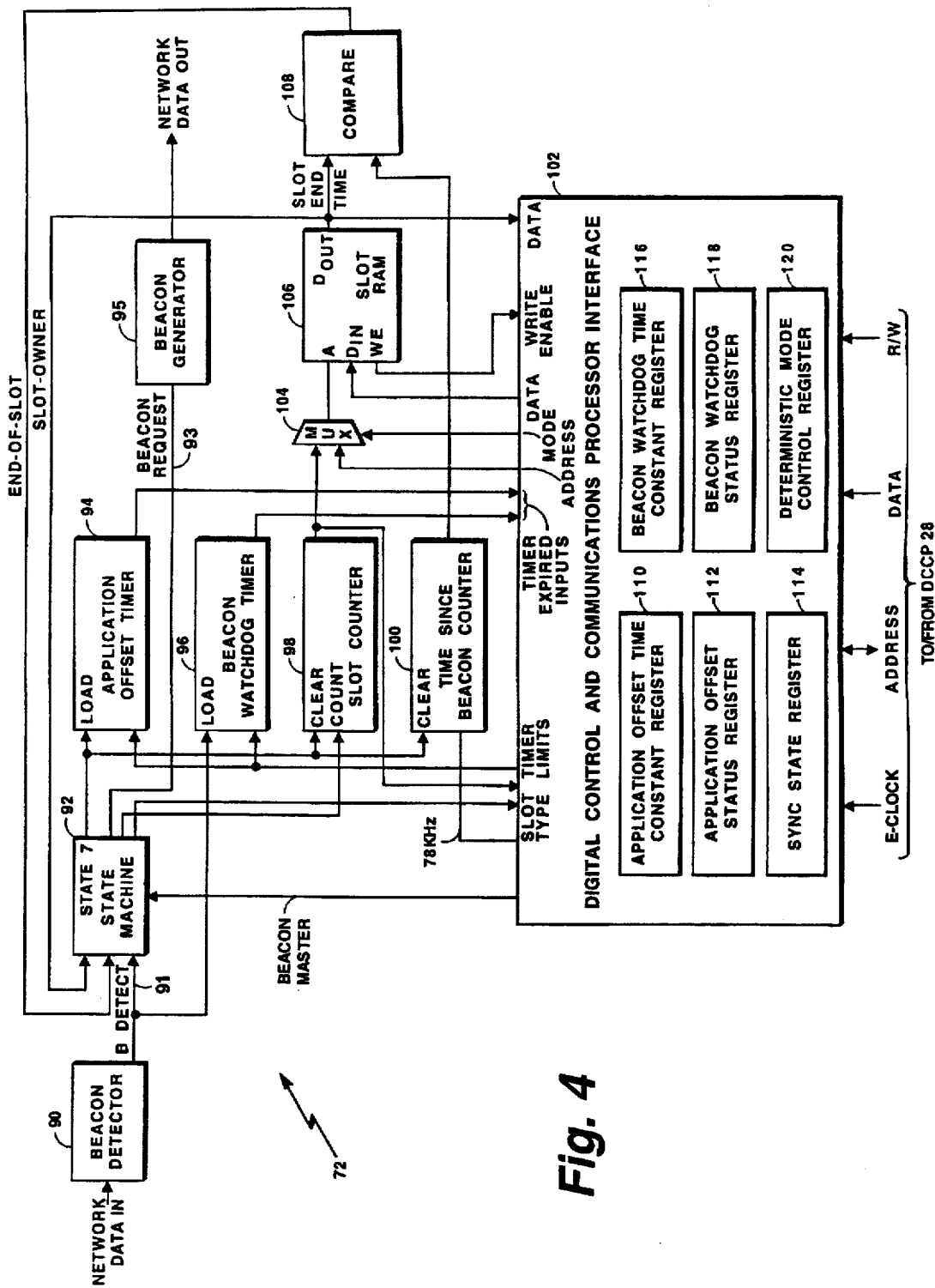
FIG. 4 is a detailed block diagram of the deterministic control portion of the transceiver as shown in FIG. 2.

Referring now to FIG. 4, a block diagram of the deterministic control 72 portion of the transceiver 26 is shown. A beacon detector 90 monitors incoming network data and generates a beacon detect 91 signal when the incoming data matches the beacon pattern defined hereinbefore. The beacon detector 90 comprises a shift register and comparator known to one of ordinary skill in the art. The beacon detect 91 signal is fed to a state machine 92 which controls the overall operation of the deterministic network protocol. The state machine 92 functions are described hereinafter. When the state machine 92 generates a beacon request 93 signal, a beacon generator 95 generates the defined beacon pattern data on the network or bus 21. The beacon generator 95 comprises a counter and logic gates known to one of ordinary skill in the art. The deterministic control 72 comprises an application offset timer 94, a beacon watchdog timer 96, a slot counter 98 and a time since beacon counter 100.

The application offset timer 94 comprises a 16 bit down counter which is loaded under state machine 92 control each time a beacon is received. The value loaded is supplied by a 16-bit application offset time constant register 110 in the DCCP interface 102. This register is loaded by the DCCP 28 during node initialization. The DCCP interface 102 provides a one-bit application offset status register 112 which permits the DCCP 28 to determine when the application offset timer has expired. This is used in conjunction with DCCP 28 application software to ensure that messages are issued only once per beacon period. Beacon Period is the sum of the duration of all priority slots $83_1$–$83_N$, plus the non-priority slot 84, the guardband slot 85, and the implicit beacon slot 81 as shown in FIG. 3.

The beacon watchdog timer is an 8 bit down counter which is loaded under state machine 92 control each time a beacon is received by the beacon detector 90. The value loaded is supplied by an 8-bit beacon watchdog time constant register 116 in the DCCP interface 102. This register is loaded by the DCCP 28 during node initialization. The DCCP 28 interface 102 provides a one-bit beacon watchdog status register 118 which permits the DCCP to determine when the beacon watchdog timer 96 has expired. This permits the DCCP 28 to detect loss of beacons on the network. Synchronization among nodes and guard-banding of transmit periods is sufficient to allow nodes remain synchronized for several beacon periods, should the beacon master generation node fail. In this case software in the DCCP 28 elects a new beacon master, which assumes responsibility for beacon generation.

The Slot Counter 98 comprises a 5-bit up counter which is reset to zero by the state machine 92 each time a beacon is received. It is used to select one of 32 locations in a slot RAM 106, and is advanced by one when commanded by the state machine 92. The time since beacon counter 100 comprises a 16-bit up counter which is reset to zero by the state machine 92 each time a beacon is received. This counter 100 counts at a 78 Khz (12.8 usec) rate for the preferred embodiment but one skilled in the art will recognize that this counter rate will vary depending on the data rate employed.

The Slot RAM 106 comprises a 32 word×16 bit static RAM which is used to define the allocation of network slots 82 within a beacon period. This RAM is loaded by the DCCP 28 during node initialization. For most of the entries, the most significant bit indicates whether the slot is allocated to this node or not. The lower 15 bits indicate the end time of the slot, with the least significant bit representing 12.8 microseconds. For the non-priority and guard band slot end times as shown in FIG. 3, all 16 bits are used to represent the slot end time. Entries into the slot RAM are as follows: (1) a series of 16 bit words defining the end times and ownership of all priority slots $83_1$–$83_N$; (2) one 16 bit value defining the start time of the non-priority slot 84; this should be identical to the end time of the last priority slot; (3) one 16 bit value defining the end time of the non-priority slot; and (4) one 16 bit value defining the end time of the guard band slot.

A multiplexer 104 provides a path by which the DCCP 28 can directly address the slot RAM 106 during initialization. A deterministic mode control register 120 in the DCCP Interface 102 permits the DCCP 28 to command entry into the deterministic mode. When not in the deterministic mode, the DCCP 28 has access to the Slot RAM 106 to perform initialization.

A compare 108 function comprises a 16 bit comparator plus gating logic which detects and indicates when the slot end time from the slot RAM 106 matches the time since last beacon. As described above, this is either a 15 or 16 bit comparison, depending on the current slot type.

The DCCP Interface 102 provides the DCCP 28 with access to the functional elements of the deterministic controller 72. It includes address decoding and data path logic which permits the DCCP 28 to read and write registers to control and monitor the deterministic network protocol. This includes: the ability to read and write the application offset timer 94 and beacon watchdog timer 96, the ability to command entry into deterministic mode, the ability to read and write the Slot RAM 104 (when not in deterministic mode), and the ability to read status registers which indicate when a timer has expired or what the current slot type is.

The deterministic control 72 located at each node 12–20 is initialized by application code running in the DCCP 28. This code writes into registers which define the application offset timer 94 and beacon watchdog timer 96 intervals. The operating mode and such items as whether the node is beacon master or beacon slave are also written at this time. It then writes a sequence of values into the slot RAM 104 which define the allocation of network slots 82. Once initialization is completed, the DCCP 28 commands entry into deterministic operating mode. While in deterministic operating mode, the DCCP interface 102 can no longer modify the slot RAM 106. The single fiber controller 64 and the deterministic controller 72 may be embodied by a single chip referred to as the single fiber control-deterministic 74, Part No. G649806-1, manufactured by Raytheon Company of Marlborough, Mass.

Figure 5:
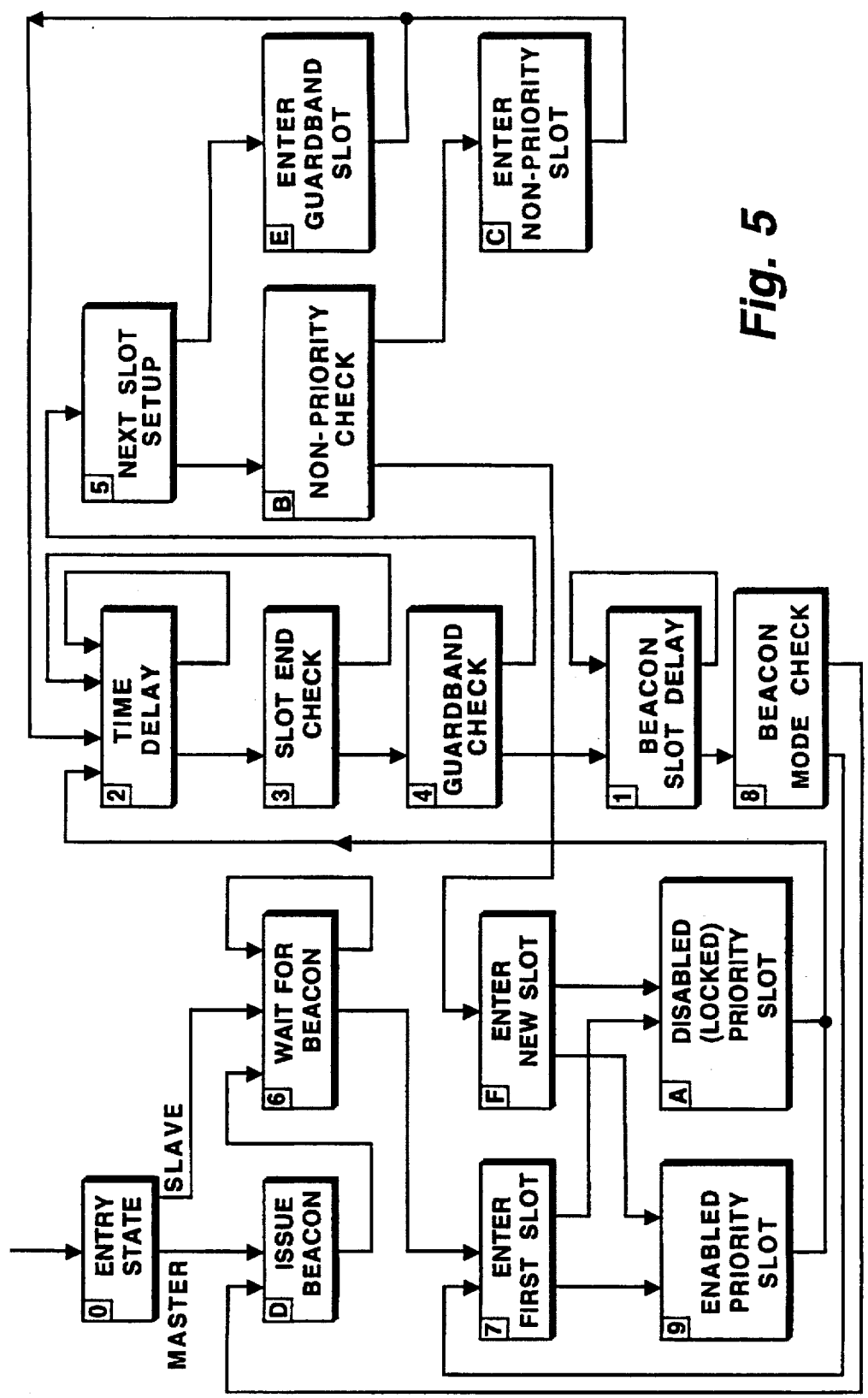
FIG. 5 is a block diagram of the state machine shown in FIG. 3.

Referring now to FIG. 4 and FIG. 5, FIG. 5 shows a flow chart of the state machine 92 of FIG. 4 with each state identified by a hexadecimal number. The state machine 92 controls the deterministic network protocol operation. When the deterministic mode is entered, the state machine 92 enters state 0 or the entry state. The beacon master moves to state D and issues a beacon request to its beacon generator 95, and then proceeds to state 6. All other nodes (the beacon slaves) go directly from state 0 to state 6. In state 6, all nodes wait for a beacon detect indication. Software handles the case when the beacon master fails to initialize, and a back-up beacon master is turned on to issue beacons. Beacon detection produces the following effects: a) the state machine 92 is forced into state 7 (enter first slot); b) the slot counter 98 is cleared; c) the time since beacon counter 100 is cleared and begins counting up; d) the application offset timer 94 is loaded with its maximum interval and begins counting down; and e) the beacon watchdog timer 96 is loaded with its maximum interval and begins counting down.

From state 7, the state machine will proceed to state 9 (enabled priority slot) if the next (first) slot is allocated to this node, and to state A (disabled (locked) priority slot) if it is not allocated to this node. In states 9 and A, the slot type is set to indicate "sync slot" or "sync lock" as appropriate. The state machine 92 then proceeds to state 2 (time delay).

In state 2, the state machine 92 waits for a 12.8 microsecond interval to expire in this preferred embodiment. Each time this interval expires, the state machine 92 advances to state 3 (slot end check), where it compares the time since last beacon to the end time of the current slot. If the two do not match, the state machine 92 returns to state 2 and waits another 12.8 microseconds. If the two match, the current slot has ended. From state 3, the state machine 92 will take one of the following paths:

a) If the slot which ended was a priority slot and the next slot is also a priority slot, the state machine 92 will pass through state 4 (guardband check) and into state 5, (next slot set up—where the slot counter is incremented), then into state B (non-priority check). Since the new slot RAM 106 location contains a different time value then the prior location, the state machine 92 moves to state F (enter new slot). State F is similar to state 7. From state F, the state machine 92 will move to state 9 or A based on slot ownership, and the process described above will repeat.

b) If the slot which ended was a priority slot and the next slot is the non-priority slot, the state machine will pass through state 4 and into state 5 (where the slot counter in incremented) and then into state B. Since the next RAM location has the same time value as the prior location, the state machine 92 moves to state C (enter non-priority slot). In state C, the slot type is set to indicate "sync open." The state machine 92 then moves to state 2 and begins waiting for the end of the non-priority slot.

c) If the slot which ended was the non-priority slot, the state machine 92 passes through state 4 and into state 5 (where the slot counter is incremented), and then into state E (enter guardband slot). In state E, a flag is set to indicate that the guardband has been entered, and the slot type is set to indicate "sync lock." The state machine 92 then moves to state 2 and begins waiting for the end of the guardband.

d) If the slot which ended was the guardband, the state machine 92 passes through state 4 and into state 1 (beacon slot delay). In state 1, the state machine 92 waits a fixed amount of time. This time is 12.8 microseconds for a slave node, or the full length of the beacon slot. Slave nodes then proceed through state 8 (beacon node check) into state 7, assuming that a beacon arrived when expected. If a beacon arrived early or late, the state machine 92 would be forced into state 7 and resynchronized. A master waits approximately 6.4 microseconds in state 1, and then proceeds through states 8 and D and into state 6, where it waits for the beacon. This accounts for the fact that it takes the master 6.4 microseconds to generate a beacon. If a beacon is generated and seen by all nodes, all are resynchronized into state 7 at the time of beacon detection. Any node which misses the beacon for some reason has made an attempt to synchronize itself, and should be in error by oscillator accuracy differences only. In this way, all nodes enter state 7 at about the same time.

As described in the state machine 92 description above, the deterministic controller 72 provides a slot type which is made available to the DCCP 28 through a 3-bit control register located in the DCCP interface 102. This register, called the sync state register 114, is used to ensure that messages are transmitted only in the proper time slots as shown in FIG. 3. Two bits are used to define four slot types as follows:

Sync Slot: A deterministic slot allocated to a particular node; one priority message may be transmitted.

Sync Lock: A deterministic slot not allocated to a particular node or nodes; transmission is prohibited. Also used during the guardband to prevent all transmissions.

Sync Open: This state is for the non-priority slot time; all available non-priority messages may be transmitted.

Normal: The network is running in non-deterministic mode. The third bit permits the DCCP 28 to detect consecutive slots of the same type. The reason for this is described hereinafter.

The use of the deterministic network protocol assumes that the system designer defines a fixed (or at least bounded) number of message transmissions by each node within a single beacon period, and a maximum execution time for the processing required in a beacon period. Each node is given enough time slots to meet the maximum transmission load. Application code is written for the application control processor of the DCCP 28 to ensure that this limit is not exceeded; the application offset timer 94 is provided for this purpose. This timer is loaded with a time constant upon receipt of a beacon (or when a beacon is expected and not received), and counts down to zero. The DCCP interface 102 provides a register 112 in which the application code can determine when the application offset timer 94 has expired. The preferred implementation is to set the application offset timer 94 to a value which is longer than the maximum processing time and shorter than the beacon period. After completing the processing required during a period, the application code polls the application offset status register 112, waiting for the timer 94 to expire. Once the application offset timer 94 has expired, the application code updates those network variables which it wishes to transmit during the next beacon period. The act of updating the network variables causes them to be placed in application buffers which are serviced by the network processor of the DCCP 28. The network processor is responsible for transmitting these network variables onto the network. The application offset timer 94 status is cleared to ensure that this action takes place only once per beacon period. Ensuring that the application code is aware of its message limits, and causing it to issue a known number of messages once per beacon period prevents the application processor of the DCCP 28 from issuing too many messages, which would eventually overflow the DCCP's 28 application buffers.

Application code may send messages either within the priority slot(s) $83_1-83_N$, which have been allocated to the node or in the non-priority contention based slot 84 which follows the priority slots. Network messages which are defined as priority messages are sent during priority slots, while others are sent during the non-priority slot.

The beacon watchdog timer 96 is provided to detect the loss of the beacons which synchronize the network. This timer is loaded with a time constant upon receipt of a beacon, and counts down to zero. The DCCP interface 102 provides a register 118 in which the application code can determine when the beacon watchdog timer 96 has expired. If beacons continue to arrive as expected, this timer is continually reloaded, and never expires. The preferred implementation is to set the beacon watchdog timer 96 to a value significantly greater than one beacon period. Since nodes attempt to maintain synchronization in the absence of the beacon, some number of missed beacons can be tolerated. The system designer is responsible for defining the number of consecutive missed beacons which can be tolerated. Some of the factors on which this limit is based are as follows: (1) the accuracy of the clock sources on the nodes; (2) the amount of time the system designer wishes to provide within each slot for synchronization drift; (3) the likelihood that a properly transmitted beacon may not be received by all nodes (due to factors such as system environment); and (4) the speed with which the system designer wishes to detect and correct for the failure of the beacon master node by electing a new beacon master.

In the preferred embodiment, the application code checks the status of the beacon watchdog timer whenever the application offset timer 94 expires, and if necessary initiates corrective action to select a new beacon master. If the beacon watchdog timer 96 expires, the selection of a new beacon master is accomplished by software. It is important that a beacon master be selected. The method of selection is not critical.

Figure 6:
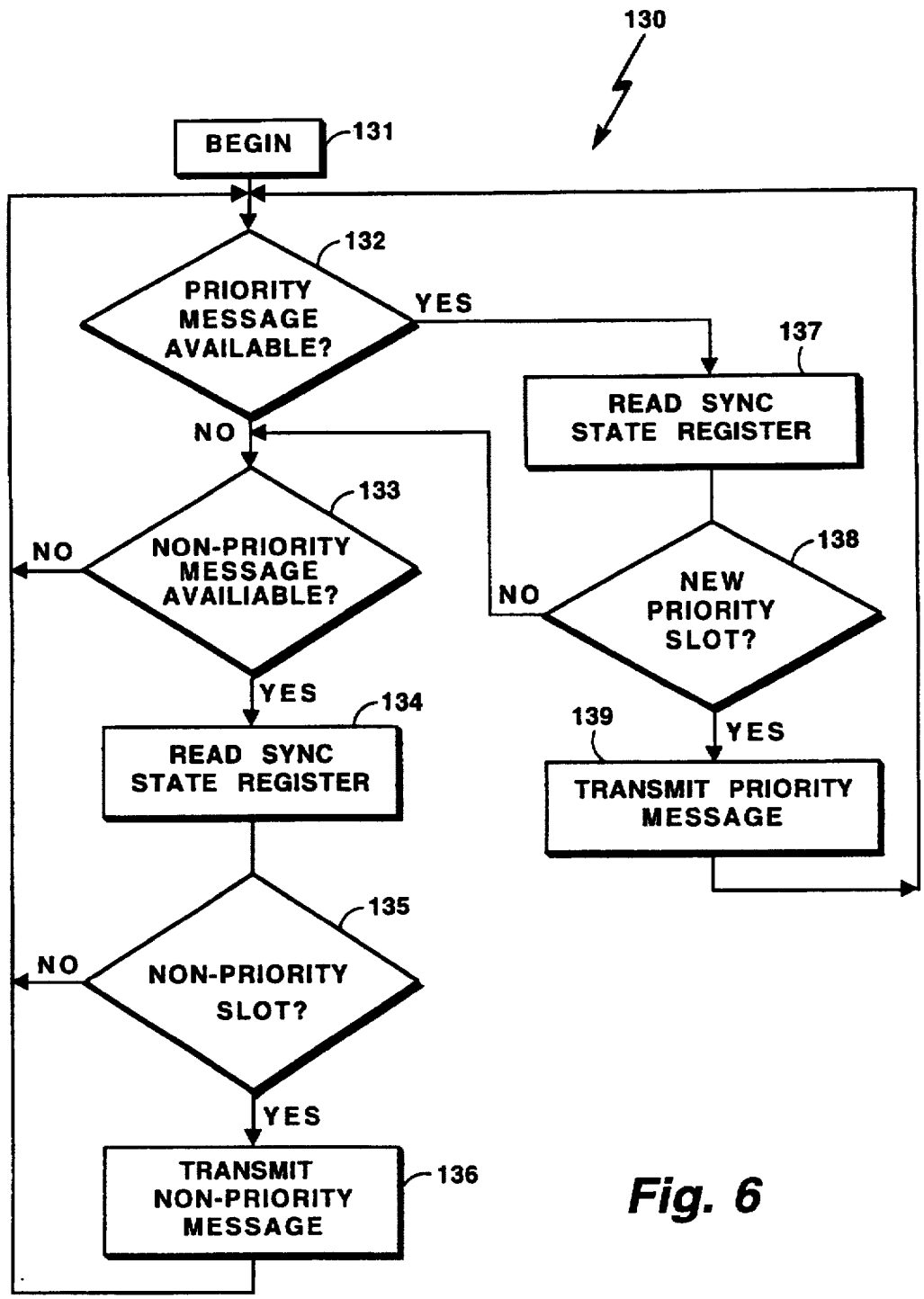
FIG. 6 is a flow chart of the media access algorithm embodied in the PROM of the DCCP in FIG. 2.

Referring now to FIG. 6, a flow chart of the media access control (MAC) software routine 130 for initiating a priority or non-priority message is shown. This MAC routine is located in the PROM 58 of the DCCP 28 shown in FIG. 2. The MAC begins 131 by checking message queues for a priority message 132 or non-priority message 133. When a message is available for transmission, the MAC examines the sync state register 134, 137 and verifies that transmission of the available message is permitted 135, 138. If the transmission is permitted, the message is sent 136, 139. If not permitted, the MAC checks the other queue and returns to this one later. In order to allow the system designer to assign consecutive priority slots to the same node, the least significant bit of the slot counter 98 is also readable in the sync state register 114 to permit the MAC to detect a new slot with the same node allocation. Since the MAC polls the sync state register 114, a variable delay may be incurred from the start of a slot time and the beginning of message transmission. The length of a priority slot must be set to accommodate both the message length and an allowance for this delay.

Messages may be transmitted over the network buses 21,22,23 at any time during the non-priority slot. The guardband 85 as shown in FIG. 3 is provided within a beacon period to ensure that a message begun at the very end of the non-priority slot 84 will be completed before the start of the beacon time slot 86. Guardband slot length must accommodate the largest non-priority message in the system.

Referring again to FIG. 1, the node 16 comprises three simplex nodes of DCCP 28/transceiver 26 elements wherein each transceiver 26 is coupled to one of the data buses 21,22,23. In particular, transceiver $26_2$ is coupled to data bus 21, transceiver $26_3$ is coupled to data bus 22 and transceiver $26_4$ is coupled to data bus 23. Each of the outputs form the three DCCPs $28_2$, $28_3$, $28_4$ are fed to one of three intelligent voters 31,32,33. Each of the voters 31–33 generates an actuation signal if two of the three inputs to the voter nodes 31–33 agree. The actuation signal from each voter node 31–33 is used to control devices $34_1,34_2,34_3$ wherein each of the devices in a preferred application comprises an electrically controlled hydraulic valve to be energized.

Figure 7:
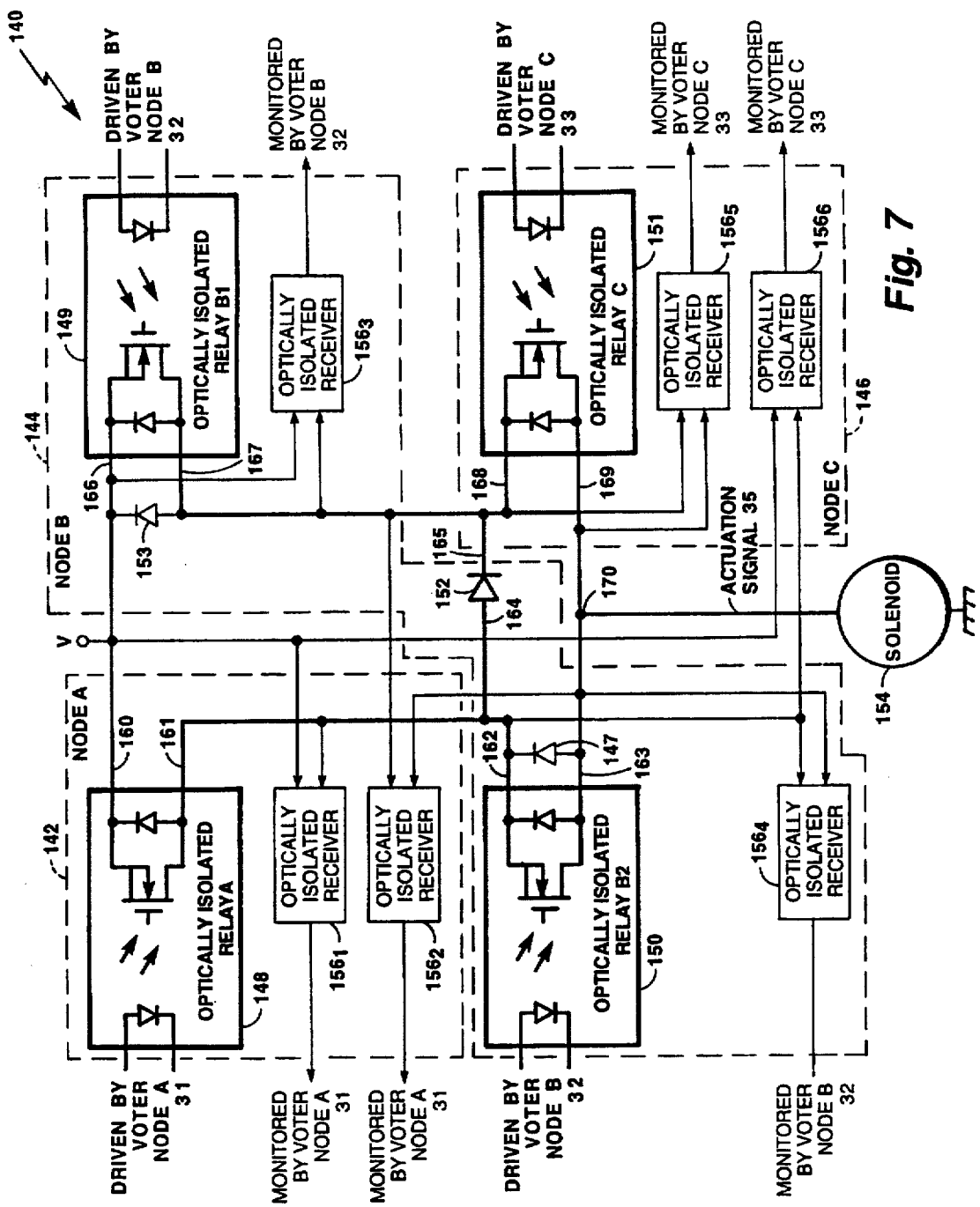
FIG. 7 is a schematic diagram of a voter switching circuit employed in the voter node of FIG. 1.

Referring now to FIG. 1 and FIG. 7, a schematic diagram of a voter switching circuit 140 is shown in FIG. 7 which comprises three portions node A 142, node B 146, and node C 144. For circuit board commonality, each circuit board comprises a transceiver 26, a DCCP 28, and one of each voter portion 142, 144, 146. A voter switching circuit 140 is constructed by taking portion 142 from one circuit board, portion 144 from a second circuit board, and portion 146 from the third circuit board. Three independent voter switching circuits 140 can be constructed from three circuit boards. Any two of the three DCCPs $28_2,28_3,28_4$ must agree in order for the voter switching circuit 140 to transfer voltage (V) to the solenoid 154. The voter switching circuit 140 is implemented using four optically isolated relays 148–151 and a bridging diode 152 arranged as shown in FIG. 7. Diodes 147,153 provide a current path for turn-off transients of inductive loads, ensuring that the voltage at the solenoid 154 does not spike the power supply voltage. If any two of the three nodes 142, 144, 146 close their optically isolated relays 148–151, a connection is made between the voltage (V) and the solenoid 154. The bridging diode 152 provides a connection path for voltage (V) to get to the solenoid 154 when the relays 148 and 151 are closed. The bridging diode 152 prevents completion of a connection path when the relays 149 and 150, which are controlled by a single DCCP 28, are closed.

All connections between the three node A 142, node B 146 and node C 144 are made using optically isolated devices. The isolation provided protects each DCCP $28_2$, $28_3,28_4$ from faults in the voltage (V) being switched by the relay, and protects the DCCPs from each other. In this manner, faults external to a DCCP, even those which damage this voter or render it inoperable, do not damage the DCCP or prevent it from carrying out other functions The isolation further permits this voter switching circuit 140 to be used as either a "high side" or a "low side" switch. If other considerations require, the voter switching circuit 140 can be placed either between voltage (V) and the solenoid, or between the solenoid and ground. The optically isolated relays 148–151 may be embodied by part number PVDZ172 manufactured by International Rectifiers of El Segundo, Calif.

Referring now to FIG. 7 and FIG. 8, in addition to the optically isolated relays 148–151 and bridging diode 152 which provide the voting function, the distributed voter switching circuit 140 includes provisions for performance monitoring and built-in test. This is provided by optically isolated receivers $156_1-156_6$ which monitor the voltage across each solid state optically isolated relay 148–151. They are arranged as shown in FIG. 7. Optically isolated receiver $156_1$ is connected across terminals 160 and 161 of optically isolated relay A 148. Optically isolated receiver $156_2$ is connected across terminals 168 and 169 of optically isolated relay C 151. Optically isolated receiver $156_3$ is connected across terminals 166 and 167 of optically isolated relay B1 149. Optically isolated receiver $156_4$ is connected across terminals 162 and 163 of optically isolated relay B2 150. Optically isolated receiver $156_5$ is connected across the terminals 168 and 169 of optically isolated relay C 151. Optically isolated receiver $156_6$ is connected to the power supply voltage (V) and to the junction of terminal 162 of optically isolated relay B2, terminal 164 of diode 152 and terminal 161 of optically isolated relay A 148. These receivers take advantage of the fact that a significant amount of current is required to activate the solenoid 154. The small currents (on the order of a few milliamperes) required by the optically isolated receivers $156_1$–$156_6$ may be passed through the solenoid with no effect on the system. A schematic representation of each optically isolated receiver $156_1$–$156_6$ is shown in FIG. 8. The resistor 157 and diode 158 values are chosen such that the leakage current through the receiver is not sufficient to activate the receiver. The receivers $156_1$–$156_6$ will only be activated if a closed relay 148–151 provides part of the current path.

The most common failure mode of the optically isolated relays 148–151 is to fail in a short circuit state. The optically isolated receivers $156_1$–$156_6$ are configured such that the closure of a relay controlled by one of DCCPs $28_2$, $28_3$, $28_4$ can be detected by each of the other two DCCPs using built-in-test software monitoring the receivers $156_1$–$156_6$. The receivers $156_1$–$156_6$ can also be used to perform a test of the relays which is coordinated by any DCCP 28 which has access to all three DCCP $28_2$, $28_3$, $28_4$ such as intelligent node 20 of FIG. 1. This test may be performed off line or when system requirements permit as an on line background diagnostic test.

The Table describes how each of the potential faults in the voter switching circuit 140 is detected by the monitoring functions of the optically isolated receivers $156_1$–$156_6$ provided. Those items which are testable "any time" may be tested by checking the monitoring points at a time when all relays are expected to be open. Those items testable during Built-In-Self-Test "BIST" may be tested only when it is safe to close certain relays and monitor the voter switching circuit 140 as a coordinated activity involving all three threads 142,144,146. This is expected to be performed either as part of pre-flight self test/diagnostics, or in a maintenance mode.

TABLE

| FAULT | WHEN TESTABLE | DETECTION METHOD |
|---|---|---|
| Relay 148 short circuit | Any time | Detected by monitors $156_2$, $156_4$, $156_5$ |
| Relay 149 or diode 153 short circuit | Any time | Detected by monitors $156_2$, $156_5$ |
| Relay 150 or diode 147 short circuit | Any time | Detected by monitors $156_1$, $156_6$ |
| Relay 151 short circuit | Any time | Detected by monitors $156_1$, $156_3$, $156_6$ |
| Relay 148 open circuit | BIST | Attempt to close 148 and use $156_2$, $156_4$, $156_5$ to verify result |
| Relay 149 open circuit | BIST | Attempt to close 149 and use $156_2$, $156_5$ to verify result |
| Relay 150 open circuit | BIST | Attempt to close 150 and use $156_1$, $156_6$ to verify result |
| Relay 151 open circuit | BIST | Attempt to close 151 and use $156_1$, $156_3$, $156_6$ to verify result |
| Diode 153 open circuit | Not detectable | This is a protection diode only |
| Diode 152 short circuit | BIST | Attempt to close 149. Monitors $156_2$ and $156_5$ should detect a current path and monitor $156_4$ should not. If 152 is shorted, monitor $156_4$ will detect a current path. |
| Diode 147 open circuit | Not detectable | This is a protection diode only |
| Diode 152 open circuit | BIST | Attempt to close 148. Monitors $156_4$, $156_2$ and $156_5$ should all detect a current path. If diode 152 is open, monitors $156_2$ and $156_5$ will not detect the current path. |

This concludes the description of the preferred embodiment. However, many modifications and alterations will be obvious to one of ordinary skill in the art without departing from the spirit and scope of the inventive concept. Therefore, it is intended that the scope of this invention be limited only by the appended claims.

What is claimed is:

1. In combination:

a distributed intelligence control system comprising a plurality of nodes interconnected by at least one bi-directional data bus disposed in a ring configuration;

each of said nodes comprises transceiver means for transmitting and receiving messages via said data bus across the ring in both directions;

each of said nodes comprises processor means coupled to said transceiver means for processing said messages to and from said transceiver means;

control means included in each of said transceiver means for generating a timing beacon in a predetermined one of said nodes for transmission to each of said other nodes via said data bus; and said control means comprises means for generating a plurality of time slots within a time period of said timing beacon wherein each of said nodes is preassigned to at least one of said time slots for transmitting critical messages at a predetermined time and at least one of said time slots being provided for contention by said plurality of nodes for transmitting non-critical messages.

2. The combination as recited in claim 1 wherein said distributed intelligence control systems comprises two or more of said bi-directional data buses for fault tolerant operations.

3. The combination as recited in claim 1 wherein said bi-directional data bus comprises a fiber optic means or for providing a transmission medium.

4. The combination as recited in claim 1 wherein said transceiver means comprises bi-directional photo diodes for transmitting and receiving messages via said data bus.

5. The combination as recited in claim 1 wherein said timing beacon comprises a pulse pattern recognized only by said control means and transparent to said processor means, said pulse pattern not being recognized as a valid data pattern.

6. The combination as recited in claim 1 wherein said time slot generating means comprises a memory means for storing node time slot assignments for each of said plurality of nodes and a duration for each of said time slots.

7. The combination as recited in claim 1 wherein said control means comprises a state machine for controlling said data bus for transmitting and receiving said messages via said data bus.

8. In a network having a plurality of nodes, each of said nodes interconnected by at least one communication medium disposed in a ring configuration, a network protocol comprising:

transceiver means in each of said nodes coupled to said communication medium for transmitting and receiving messages across the ring in both directions;

processor means coupled to each of said transceiver means in each of said nodes for processing said messages to and from said communication medium;

means in each of said nodes for generating and detecting a timing beacon for synchronizing said nodes, one of said nodes being preassigned to generate said timing beacon; and means in each of said nodes for generating a plurality of time slots within a time period of said timing beacon, each of said nodes being preassigned at least one of said time slots for transmitting critical messages and at least one of said time slots being provided for contention by said plurality of nodes to transmit non-critical messages.

9. The network as recited in claim 8 wherein said communication medium comprises a fiber optic means for transmitting and receiving messages.

10. The network as recited in claim 8 wherein said transceiver means comprises bi-directional photo diodes for transmitting and receiving messages via said communication medium.

11. The network as recited in claim 8 wherein said transceiver comprises uni-directional photo diodes for transmitting and receiving messages via said communication medium.

12. The network as recited in claim 8 wherein said timing beacon comprises a pulse pattern recognized only by said nodes and transparent to said processor means, said pulse pattern not recognized as a valid data pattern.

13. The network as recited in claim 8 wherein said time slot generating means comprises a memory means for storing node time slot assignments and a duration of each of said time slots for each of said plurality of nodes.

14. The network as recited in claim 8 wherein said means for generating a plurality of time slots comprises a state machine for controlling said network protocol for transmitting and receiving said messages via said communication medium.

15. A network having a deterministic network protocol comprising:

a plurality of nodes, each of said nodes interconnected by at least two of a plurality of communication media for fault tolerant operation, each media disposed in a ring configuration;

transceiver means included in each of said nodes and connected to said plurality of communication media, for transmitting and receiving messages across the ring in both directions of the ring;

processing means, in each of said nodes coupled to said transceiver means for processing said messages to and from said communication media;

means in each of said nodes for generating and detecting a timing beacon for synchronizing said nodes, one of said nodes being preassigned to generate said timing beacon;

said timing beacon comprises a pulse pattern recognized only by said nodes and transparent to said processor means, said pulse pattern not recognized as a valid data pattern; and means in each of said nodes for generating a plurality of time slots during a time period of said timing beacon, each of said nodes being preassigned at least one of said time slots for transmitting critical messages, and at least one of said time slots provides for contention by said plurality of nodes to transmit non-critical messages.

16. The network as recited in claim 15 wherein said communication medium comprises a fiber optic means for transmitting and receiving messages.

17. The network as recited in claim 15 wherein said transceiver means comprises bi-directional photo diodes coupled to said communication media for transmitting and receiving messages via said communication media.

18. The network as recited in claim 15 wherein said transceiver means comprises uni-directional photo diodes coupled to said communication media for transmitting and receiving messages via said communication media.

19. The network as recited in claim 15 wherein said time slot generating means comprises a memory means for storing node time slot assignments and a duration of each of said time slots for each of said plurality of nodes.

20. The network as recited in claim 15 wherein said means for generating a plurality of time slots comprises a state machine for controlling a network protocol for transmitting and receiving said messages via said communication media.

21. A method of providing a distributed intelligence control system comprising the steps of:

interconnecting a plurality of nodes by at least one bi-directional data bus in a ring configuration;

transmitting and receiving messages via said data bus across the ring in both directions with transceiver means in each of said plurality of nodes;

processing said messages to and from said transceiver means with processor means coupled to said transceiver means;

generating a timing beacon in a predetermined one of said nodes for transmission to each of said other nodes via said data bus with control means in each of said transceiver means; and generating a plurality of time slots within a time period of said timing beacon wherein each of said nodes is preassigned at least one of said time slots for transmitting critical messages at a predetermined time and at least one of said time slots is provided for contention by said plurality of nodes for transmitting non-critical messages.

22. The method as recited in claim 21 wherein said step of interconnecting a plurality of nodes comprises the step of providing two, three or more bi-directional data buses for fault tolerant operation.

23. The method as recited in claim 21 wherein said step of interconnecting said plurality of nodes by at least one bi-directional data bus comprises the step of providing a fiber optic cable for said data bus transmission medium.

24. The method as recited in claim 21 wherein said step of transmitting and receiving messages via said data bus comprises the step of said transceiver means providing bi-directional photo diodes for coupling to said data bus.

25. The method as recited in claim 21 wherein said step of generating a timing beacon comprises the step of providing a pulse pattern recognized only by said control means and transparent to said processor means, said pulse pattern not being recognized as a valid data pattern.

26. The method as recited in claim 21 wherein said step of generating a plurality of time slots comprises the step of providing a state machine for controlling said data bus when transmitting and receiving said messages via said data bus.

27. A method of providing a network protocol in a network having a plurality of nodes, each of said nodes interconnected by at least one communication medium disposed in a ring configuration comprising the steps of:

transmitting and receiving messages in each of said nodes coupled to said communication medium across the ring in both directions;

processing said messages to and from said communication medium with processor means coupled to each of said transceiver means in each of said nodes;

generating and detecting a timing beacon for synchronizing said nodes with means in each of said nodes, one of said nodes being preassigned to generate said timing beacon; and generating a plurality of time slots in each of said nodes during a time period of said time beacon, each of said nodes being preassigned at least one of said time slots for transmitting critical messages and at least one of said time slots being provided for contention by said plurality of nodes to transmit non-critical messages.

28. The method as recited in claim 27 wherein said step of transmitting and receiving messages in each of said nodes coupled to said communication medium comprises the step of providing bi-directional photo diodes coupled to a fiber optic cable for transmitting and receiving messages via said communication medium.

29. The method as recited in claim 27 wherein said step of transmitting and receiving messages in each of said nodes coupled to said communication medium comprises the step of providing uni-directional photo diodes coupled to fiber optic cable for transmitting and receiving messages via said communication medium.

30. The method as recited in claim 27 wherein said step of generating a timing beacon comprises the step of providing a pulse pattern recognized only by said nodes and transparent to said processor means, said pulse pattern not recognized as a valid data pattern.

31. The method as recited in claim 27 wherein said step of generating a plurality of time slots comprises the step of providing a memory means for storing node time slot assignments and a duration of each of said time slots for each of said plurality of nodes.

32. The method as recited in claim 27 wherein said step of generating a plurality of time slots comprises the step of providing a state machine for controlling said network protocol for transmitting and receiving said messages via said communication medium.

33. The method as recited in claim 27 wherein said method further comprises the step of providing at least three communication media interconnecting said nodes for fault tolerant operation.

* * * * *